Nov. 30, 1965 D. B. LAWHON 3,221,326
ANALOG TO DIGITAL CONVERTER
Filed Oct. 31, 1962
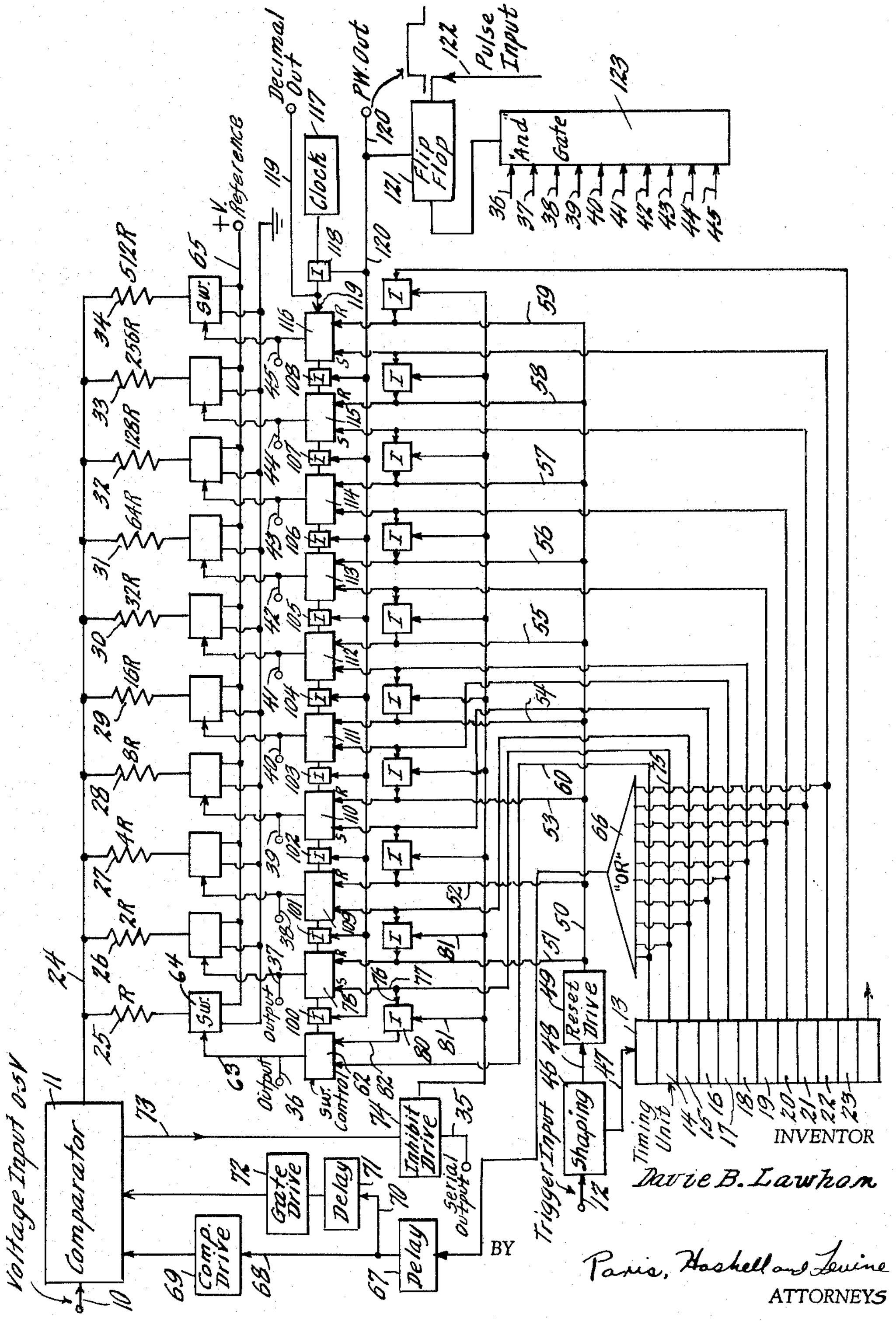
INVENTOR
Davie B. Lawhon
BY
Paris, Haskell and Levine
ATTORNEYS United States Patent Office 3,221,326
Patented Nov. 30, 1965

3,221,326
ANALOG TO DIGITAL CONVERTER

Davie B. Lawhon, Warminster, Pa., assignor, by mesne assignments, to United Aircraft Corporation, a corporation of Delaware Filed Oct. 31, 1962, Ser. No. 234,340
8 Claims. (Cl. 340—347)

This invention generally relates to electronic analog to digital converters wherein a variable amplitude voltage or current signal is rapidly and accurately converted into pulse codes, e.g., a series of electrical impulses spaced in time according to the analog signal, which codes represent the signal in both the binary and decimal numbered systems.

In an earlier application, assigned to the same assignee, Serial Number 64,465, filed October 24, 1960, now Patent 3,167,757, there is disclosed an analog to digital converter system wherein a time variable analog signal of varying amplitude is converted into a digital number expressed in a binary or other pulse code form. The conversion is performed by a series of successive approximations, by producing a different fixed amplitude voltage corresponding to each different order of the digital number to be found and successively diminishing the analog signal by these fixed voltages depending upon whether that order of the digital number is contained in the analog signal. When the series of diminishing operations are completed, the various orders of the digital number that are found to be contained in the analog signal correspond in digital form to the converted analog signal. According to this invention, the digital number signal may be read-out in the form of pulses either sequentially during the diminishing steps or simultaneously, after all of the diminishing steps have been completed.

According to the present invention, there is provided a similar system for first converting the analog signal of varying amplitude into a binary pulse code form which is stored in a storage register. Thereafter in a further series of operations, the stored binary number is then converted into decimal pulse form, thereby to provide both a binary read-out and decimal read-out as is desired. The decimal pulse code may be read-out in serial fashion, as a series of impulses corresponding in number of the amplitude of the original analog voltage, or may be read-out in a form of a single impulse having a variable time duration proportional to the amplitude of the analog voltage; or may alternatively be obtained and read-out both in serial form and in pulse width modulated form, if so desired.

It is accordingly a principal object of the invention to provide a rapid and accurate analog to digital converter.

Another object is to provide such converter that is comprised exclusively of solid state components of lightweight and small size and wherein the system possesses a minimum number of such components.

Still another object is to provide such a system that is particularly well adapted for purposes of decoding information as may be obtained in telemetry systems.

Other objects and many additional advantages will be more readily understood by those skilled in the art after a detailed consideration of the following specification taken with the single accompanying drawing, illustrating in electrical block diagram form, one preferred embodiment of the invention.

In view of the relatively large number of individual circuits involved, it is believed helpful to initially outline briefly the overall functioning of the system without reference to each of the individual circuits, and thereafter to consider the detailed system operation and the functioning of the individual circuits. Referring to the drawing, the variable amplitude analog signal to be converted into digital form is initially introduced into the system over line 10 leading to a comparator circuit 11, and thereafter a triggering start impulse is applied at terminal 12 to commence automatic operation of the system.

During operation, a second input line 24 leading to the comparator is successively energized by a series of different fixed voltage levels, and the comparator 11 functions to compare the analog voltage on line 10 with each of the fixed voltage levels on line 24. Each of these fixed voltage levels corresponds to a different order or digit of a binary number to be determined, whereby after each comparison is made, it is known whether or not that digit of the binary number is contained in the analog voltage.

For producing each of the fixed voltage levels on line 24, there is provided a series of different valued resistors 25 to 34, inclusive, with a different resistor being provided for each order of the binary number. Each of the resistors 25 to 34 has one terminal connected to line 24, as shown, and the other terminal thereof being connected through a suitable switch such as switches 64, 79, and 150, to a fixed source of reference voltage over line 65. Consequently, as the switch corresponding to each resistor is closed, the resistor associated therewith is energized to apply a fixed level of voltage to line 24. According to the invention, the resistors 25 to 34 are proportioned or weighted in value according to a binary coding, with the first resistor 25 being one-half the value of the second resistor 26; the second resistor 26 being, in turn, one-half that of the third and so forth, whereby energization of the first resistor 25 applies a voltage increment to line 24 that is twice as large as that provided by resistor 26 and four times that provided by the third resistor 27. In this manner, energization of the first resistor 25 applies a fixed increment voltage to the line 24 corresponding to the highest order of the binary number to be found and each of the other resistors adds a different increment of voltage to the line 24 corresponding to the next succeeding lower orders of the binary number. Energization of these resistors 25 to 34, inclusive, are controlled in succession by the switches, such as 64, 79, and 150, and the like, which in turn are operated successively by a suitable electronic commutating mechanism to be described hereafter.

After each fixed level of voltage is applied to line 24, the comparator 11 compares this voltage with the analog input signal, and if the level of voltage on line 24 exceeds the amplitude analog input signal, the switch associated with that resistor is deenergized to remove that voltage level, whereas if the voltage level on line 24 is less than that of the input signal on line 10, the switch remains actuated to continue applying this level voltage to its associated resistor. Thereafter, the next succeeding switch is actuated to energize the next one of the resistors 26 to 34 and apply the next lower level voltage increment to the line 24. Successive comparisons are again made to determine whether each next level of voltage is contained in the analog signal 10 and, this mode of operation continues until all of the switches have been successively operated and then the series of operations is terminated. After all of the voltage levels have been successively compared with the signal, the voltage on line 24 substantially equals the input signal and those of the resistor switches that remain actuated correspond in position to the different digits of the binary number.

This system lends itself to either a sequential or simultaneous read-out of the binary number. For a sequential or serial read-out, it is merely necessary to note after each comparison step whether or not that digit of the binary number is contained in the input analog signal, and this information is readily available at the comparator circuit 11 over output line 35. Consequently, as each comparison is made between the analog signal on line 10 and the fixed voltage level on line 24, a pulse is generated by the comparator 11 over line 73 and thence over line 35 to indicate whether or not that digit of the binary number being compared is contained in the analog signal. For simultaneous read-out on the other hand, the on-off condition of the various switches after all of the comparisons have been made indicate which ones of the resistors 25 to 34 remain in an energized condition; and, by merely noting those of the switches that remain energized after the completion of the comparison steps, the binary number corresponding to the analog voltage 10 may be simultaneously read out.

Each of the switches for controlling the resistors 25 to 34, inclusive, are preferably voltage controlled switches that are adapted to be commutated into operation successively by pulses. For commutating each of these switches into operation, there is provided a series of switch control units 62, 78, and 109 to 116, respectively, with a different switch control unit being provided for each of these switches. These switch control units are preferably in the form of double stability state circuits, such as flip-flop circuits, having a pair of input control lines and a single output line for actuating their respective switches.

For example, referring to the highest order switch control unit 62, it is noted that the switch control unit is provided with a pair of input lines 60 and 82, and output line 63, whereby a pulse received at the input line 60 triggers the flip-flop 62 to produce a fixed potential of given amplitude at the output line 63 to actuate the switch 64, and a pulse received on the second input line 82 thereof restores the potential on the output line 63 to its original value to deenergize the switch 64.

After all of these switch control units have been successively commutated into operation to complete the conversion of the analog signal into binary form, the binary number to be determined may be found by scanning the condition of the switch control units, each of which is provided with an output terminal 36 to 45, respectively, as shown which is read out. Stated in another manner, the different digits of the binary number to be determined may be considered as being stored in the different switch control units, with each unit corresponding to a different order or digit of the binary number. In this manner, the "zero" or "one" output voltage on each switch control unit indicates whether or not that binary order is contained in the analog signal.

The system as thus far described, and the additional timing and control circuitry for sequentially commutating these switch control units into operation and performing the other functions of the conversion process, is identical to that disclosed in much greater detail in the copending application mentioned above and therefore a further detailed description of these components is believed unnecessary in the present application. According to the present invention, however, there is provided additional means for further converting the binary number stored in the switch control units into decimal pulse form.

Returning to the drawing for an understanding of this second conversion of the number from a binary to decimal form, there is additionally provided a series of gate circuits 100 to 108, inclusive, with each gate circuit interconnecting an adjoining pair of the switch control units. All of these gate circuits are adapted to be opened and closed in unison, by a control potential produced on line 120 which is connected to energize all of the gates 100 to 108, inclusive, in parallel, as shown. When all of these gates are energized or closed, the switch control units (preferably flip-flop circuits) are interconnected in a cascaded relationship in the manner of a multistage counter of known configuration, whereas when all of these gates are simultaneously open, the various switch control units are isolated from one another by the open gates and function individually as described above. During the conversion of the analog signal on line 10 into binary digit form as described, the gates 100 to 108, inclusive, are all maintained in an open condition, whereby the switch control units function individually and are cycled or commutated successively to add increments of fixed voltage to the line 24 as described above. After the completion of this conversion, the output lines 36 to 45 of the switch control units may then be scanned to read-out the binary number, if desired.

When it is desired to convert the stored binary number into a decimal pulse form, a start ilmpulse is directed over line 122 to a control flip-flop circuit 121 which produces a control voltage on line 120 leading to the gate circuits 100 to 108, inclusive. The production of this control voltage on line 120 operates to close all of the gates 100 to 108, inclusive, thereby interconnecting the switch control units in cascaded arrangement to function as a binary counter, with each of the switch control units functioning as a different binary stage. However, as will be recalled, the switch control units have previously stored the binary digit number, and consequently after these units are interconnected in cascade, the multistage binary counter being produced, has accumulated a number therein corresponding to the converted analog signal. Thus, at the beginning of the operation for converting the binary number into decimal form, there is provided a storage register or counter having a count accumulated therein corresponding to the binary number.

The control voltage produced on line 120 also functions to close a gate circuit 118, located before the input of the lowest order switch control unit 116 as shown, and the closed gate 118 permits impulses from a clock generator 117 to pass through the closed gate 118 to the input of the first stage 116 of the storage register. After closure of this gate 118, the clock generator 117 directs a continuous series of uniform pulses of constant time duration and constant spacing, which pass through the gate 118 and into the counter mechanism. These clock impulses are successively counted or accumulated in the storage register, which is now functioning as a counter, until such time as the multistage counter has reached the limit of its count. Upon this occurring, all of the output lines 36 to 45, inclusive, leading from the individual ones of the stages of the counter, then indicate a "zero" condition voltage, thereby signaling that the multistage counter has been completely cycled and returned to its initial value. These output lines 36 to 45 are connected to an "and" gate 123 (shown at the lower right hand side of the drawing) which produces an output pulse only upon all of the output lines signaling this zero conduction voltage. This pulse from the and gate 123 is directely upwardly to the opposite terminal of the control flip-flop 121 thereby to switch the position of the flip-flop to its former stability state and return the voltage on control line 120 to its lower level thereby to open all of the counter gates 100 to 108, inclusive, and the input gate 118, and thereby preventing further pulses from the clock generator 117 from entering into the counter mechanism.

Since the multistage counter has a fixed capacity (as disclosed, the counter comprises 10 stages providing a fixed capacity count of 512 pulses), and since the multistage counter had originally stored a number corresponding to the analog signal on line 10, the number of pulses from the clock generator 117 that may be added to the number already stored in the counter is proportional to the difference between the fixed capacity of the counter and the number previously stored therein. Consequently, the number of pulses from the clock generator 117 that may enter the counter before opening of gate 118 is proportional to the complement of the desired decimal number. The complement of the number in decimal form is therefore obtained over output line 119 over which is produced a number of pulses proportional to the original analog signal on line 10.

Additionally, it will be noted that the control flip-flop circuit 120 is maintained in a given stability state until the counter has accumulated a number of pulses corresponding to the complement of the analog signal. Consequently, there is obtained a pulse output over control line 120 whose duration or pulse-width is also proportional to the complement of the analog input signal on line 10.

Briefly, recapitulating the above binary to decimal conversion operations, after the translation of the analog signal into a binary digit form, there is stored in the switch control units 62, 78, and 109 to 116, inclusive, a binary number corresponding to the input analog signal on line 10. To convert this number into decimal pulse form, the individual switch control units are then interconnected into a multistage counter by interconnecting these units in a serial cascaded arrangement without changing the stability states of the individual units. This provides a counter mechanism having stored therein a digital number corresponding to the analog signal. A gate 118 is also actuated to permit a serial entry of impulses from a constant frequency clock oscillator 117, which impulses enter the multiple stage counter and are successively counted and accumulated by the counter. The number of pulses from the clock oscillator 117 which are allowed to enter the counter is determined by the difference between the fixed capacity of the counter and the digital number previously stored therein. Thus, the counting operation continues until the multiple stage counter completes its cycle of operations whereupon an "and" gate circuit 123 senses the completion of counting by the stages and energizes the flip-flop circuit 121 in such manner as to open all of the gate circuits, thereby disconnecting the individual stages of the counter and preventing any further clock impulses entering into the stages. The number of pulses from the clock oscillator 117 that are permitted to enter the counter, therefore, are equal in number to the complement of the number already stored in the counter which, in turn, is proportional to the original analog signal on line 10. Since these pulses are produced in sequence by the clock oscillator 117, the number of pulses being directed over output line 119 is consequently proportional to the decimal number desired. Additionally, the control flip-flop circuit 121 is energized in one given stability state for a time interval equal to the total number of clock impulses passing into the counter, where a variable duration output pulse is produced over line 20 having a duration corresponding to the decimal number complement of the original analog input signal 10. Thus, the overall system as described, produces both a serial binary output of pulses over line 35 corresponding to the original analog signal, a parallel read-out of binary output pulses from the output lines 36 to 45, inclusive, a serial pulse output in decimal form over line 119 corresponding to the complement of the original analog voltage 10, and a pulse width modulated output impulse over line 20 also corresponding to the decimal equivalent of the original analog signal 10.

Although but one preferred embodiment of the invention has been illustrated and described, it is believed evident that many changes may be made by those skilled in the art without departing from the spirit and scope of the invention. Accordingly, this invention is to be considered as being limited only by the following claims hereto.

What is claimed is:

1. In an analog to digital converter, means for producing a fixed different level voltage corresponding to each different digit of a binary number to be found, means for comparing each such level voltage with an analog signal to be converted to determine if that digit is contained in the analog signal and retaining that level if it is contained in the analog signal and rejecting that level if it is not contained in the analog signal, means for storing each retained digit of the binary number in unconnected stages of a storage register, means for interconnecting the stages of the storage register as a counter, and means for resetting the connected stages of the storage register to their original condition by a series of successive pulse increments and noting the number of increments required to restore the register to its initial condition, whereby the sum of the pulse increments required to restore the register is representative of the analog signal.

2. In an analog to digital converter, means for converting an unknown analog signal into multibit binary digit form and individually storing each of the binary bits in unconnected stages of a register, and readout means for said register for reading out the stored binary number as a series of pulses whose sum represents the analog signal, said readout means comprising means for interconnecting the stages of the register as a fixed capacity pulse counter, and means for sequentially applying pulses to said counter until the capacity of the counter is reached.

3. In the converter of claim 2, said read out means comprising a plurality of gate circuits for interconnecting the stages of the register to provide a multistage counter having the binary number stored therein, and means for reading out the stored binary number from the counter as a successive series of pulses and as a single pulse having a duration representative of the stored number.

4. An analog to binary to pulse group converter comprising: means for converting an unknown analog signal into a series of binary bits stored in individual unconnected stages of a storage register, nondestructive read out means for both simultaneously and sequentially reading out the binary bits from the register in binary pulse code form, and destructive read out means operable after the binary read out for sequentially reading out the stored bits from the register as a sequential series of pulses whose sum represents the analog signal and simultaneously producing a single pulse having a duration representative of the sequential series of pulses.

5. An analog to binary bit to pulse group converter comprising: a multistage storage register having its stages unconnected, converter means for converting an unknown analog signal into a series of binary bits and storing each bit in a different stage of the register, nondestructive readout means for both simultaneously and sequentially reading out the binary bits from the register in pulse code form, a plurality of gate circuits for interconnecting the stages of the register to provide a pulse counter, means for energizing said gate circuits, and means for cycling the counter to read out the binary bits as a sequential series of pulses whose sum represents the analog signal.

6. In the converter of claim 5, the addition of means for producing a single pulse having a duration proportional to the time for recycling the counter.

7. An analog to binary to pulse group converter comprising: a multistage storage register, converter means for converting an unknown analog signal into a code of binary bits and storing each bit in a different stage of the register, a plurality of gate circuits for interconnecting said stages in cascaded arrangement as a pulse counter, a switching circuit being externally energizable to simultaneously energize said gate circuits to cascade said stages, a clock generator for cycling said pulse counter, a detector responsive to the complete cycling of said counter to disable said switching circuit, a sequential output for producing a series of pulses equal to the number of pulses from said clock generator to cycle said counter, and a pulse width output responsive to said switching circuit to produce a single pulse having a duration proportional to the number of pulses produced by said sequential output.

8. An analog to binary to pulse group converter having both sequential and simultaneous pulse code output in the binary and pulse group systems comprising: a converter for converting an unknown analog signal into a multibit binary number and provided with a storage register for storing each bit for simultaneous and sequential readout of the binary number, and a third readout means, said third readout means comprising means for transforming said storage register into a pulse counter, and means for resetting the pulse counter to read out the stored number as a series of pulses whose sum represents the analog signal.

References Cited by the Examiner

UNITED STATES PATENTS

| | | | |
|---|---|---|---|
| 2,853,235 | 9/1958 | Brinster | 235—92 |
| 2,966,670 | 12/1960 | Foss | 340—347 |
| 3,071,324 | 1/1963 | Schroeder et al. | 340—347 |
| 3,157,873 | 11/1964 | Slack | 340—347 |

MALCOLM A. MORRISON, *Primary Examiner.*

D. M. ROSEN, W. J. KOPACZ, *Assistant Examiners.*